United States Patent
Shizuno

(10) Patent No.: US 8,914,654 B2
(45) Date of Patent: Dec. 16, 2014

(54) INFORMATION PROCESSING APPARATUS, NETWORK INTERFACE APPARATUS, METHOD OF CONTROLLING BOTH, AND STORAGE MEDIUM

(75) Inventor: Kaori Shizuno, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 991 days.

(21) Appl. No.: 12/720,472

(22) Filed: Mar. 9, 2010

(65) Prior Publication Data
US 2010/0235500 A1 Sep. 16, 2010

(30) Foreign Application Priority Data
Mar. 13, 2009 (JP) .................... 2009-060685

(51) Int. Cl.
G06F 1/32 (2006.01)
H04L 12/12 (2006.01)
H04L 29/06 (2006.01)

(52) U.S. Cl.
CPC ............ *H04L 12/12* (2013.01); *H04L 63/08* (2013.01); *Y02B 60/34* (2013.01); *H04L 63/164* (2013.01); *Y02B 60/32* (2013.01); *H04L 69/12* (2013.01)
USPC ............................ 713/320; 713/168; 713/324

(58) Field of Classification Search
None
See application file for complete search history.

(56) References Cited

U.S. PATENT DOCUMENTS

| | | | |
|---|---|---|---|
| 6,795,450 B1* | 9/2004 | Mills et al. | 370/463 |
| 6,981,140 B1* | 12/2005 | Choo | 713/164 |
| 2006/0236143 A1 | 10/2006 | Kidoguchi | |
| 2007/0067445 A1* | 3/2007 | Vugenfirer et al. | 709/224 |
| 2007/0230393 A1* | 10/2007 | Sinha et al. | 370/328 |
| 2010/0174808 A1* | 7/2010 | Dabagh et al. | 709/221 |

FOREIGN PATENT DOCUMENTS

| | | |
|---|---|---|
| JP | 2000-312203 A | 11/2000 |
| JP | 2006-259906 A | 9/2006 |
| WO | 2008/115823 A1 | 9/2008 |

OTHER PUBLICATIONS

U.S. Appl. No. 12/729,017, filed Mar. 22, 2010, Shinichi Uchikawa.
Kazuo Kitamura et al., "An MLDv2 / MLDA Proxy Method," The Institute of Electronics, Information and Communication Engineers, NS 2004-42, vol. 104, No. 108, pp. 5-8.

* cited by examiner

*Primary Examiner* — Dennis M Butler
(74) *Attorney, Agent, or Firm* — Canon USA, Inc. IP Division

(57) ABSTRACT

An apparatus includes a storage unit configured to store information which is acquired by a negotiation with an external apparatus and is for communication via a network, a detection unit configured to detect that conditions are satisfied for switching to a power saving mode in which power consumption is smaller than in a normal power mode while the normal power mode is operating, and a notification unit configured to notify a network interface of the stored information when the conditions for switching to the power saving mode are satisfied.

9 Claims, 16 Drawing Sheets

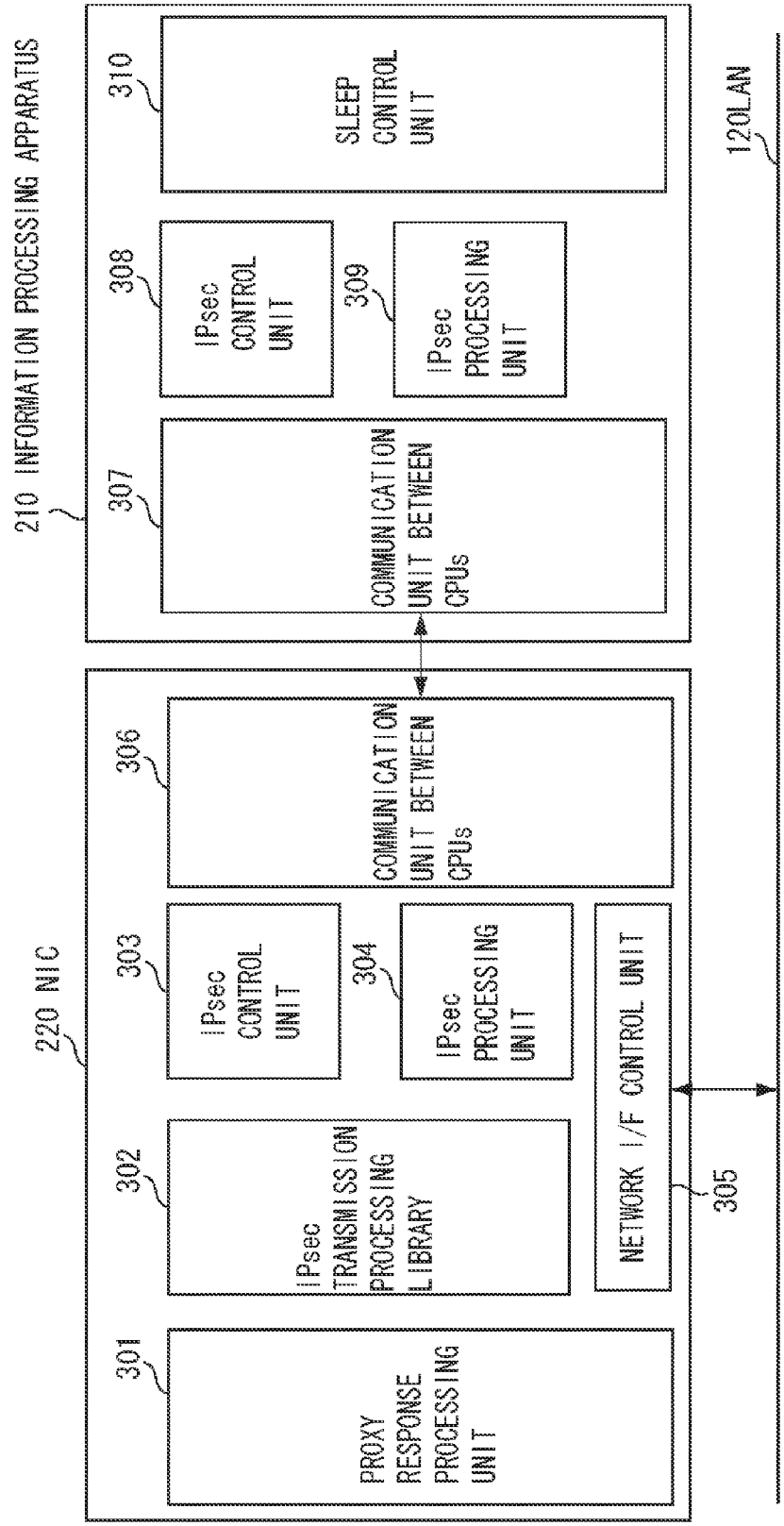

FIG. 4

| 401 | SPI | 256 |
|---|---|---|
| 402 | ENCRYPTION ALGORITHM | 3DES |
| 403 | AUTHENTICATION ALGORITHM | SHA1 |
| 404 | ENCRYPTION KEY | xxxxxxx |
| 405 | AUTHENTICATION KEY | Yyyyyyy |
| 406 | LIFETIME TYPE | 1 |
| 407 | LIFETIME | 100000 |
| 408 | SA GENERATION TIME | NULL |
| 409 | AMOUNT OF TRANSMISSION DATA | 800 |
| 410 | SEQUENCE NUMBER | 800 |
| 411 | TRANSMISSION SOURCE ADDRESS | 100.0.0.1 |
| 412 | TRANSMISSION DESTINATION ADDRESS | 100.0.0.2 |
| 413 | TRANSMISSION SOURCE PORT NUMBER | 80 |
| 414 | TRANSMISSION DESTINATION PORT NUMBER | 80 |
| 415 | PROTOCOL TYPE | 80 |

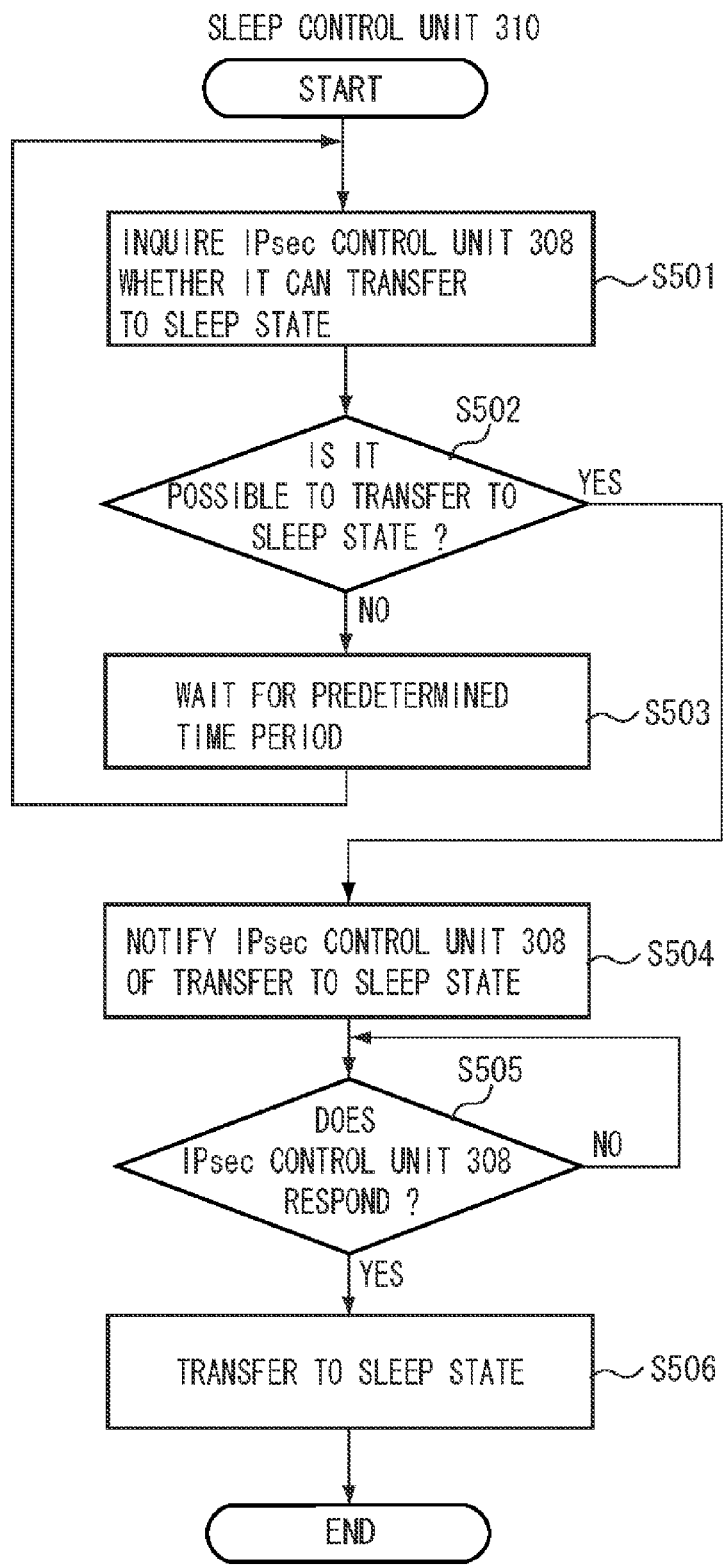

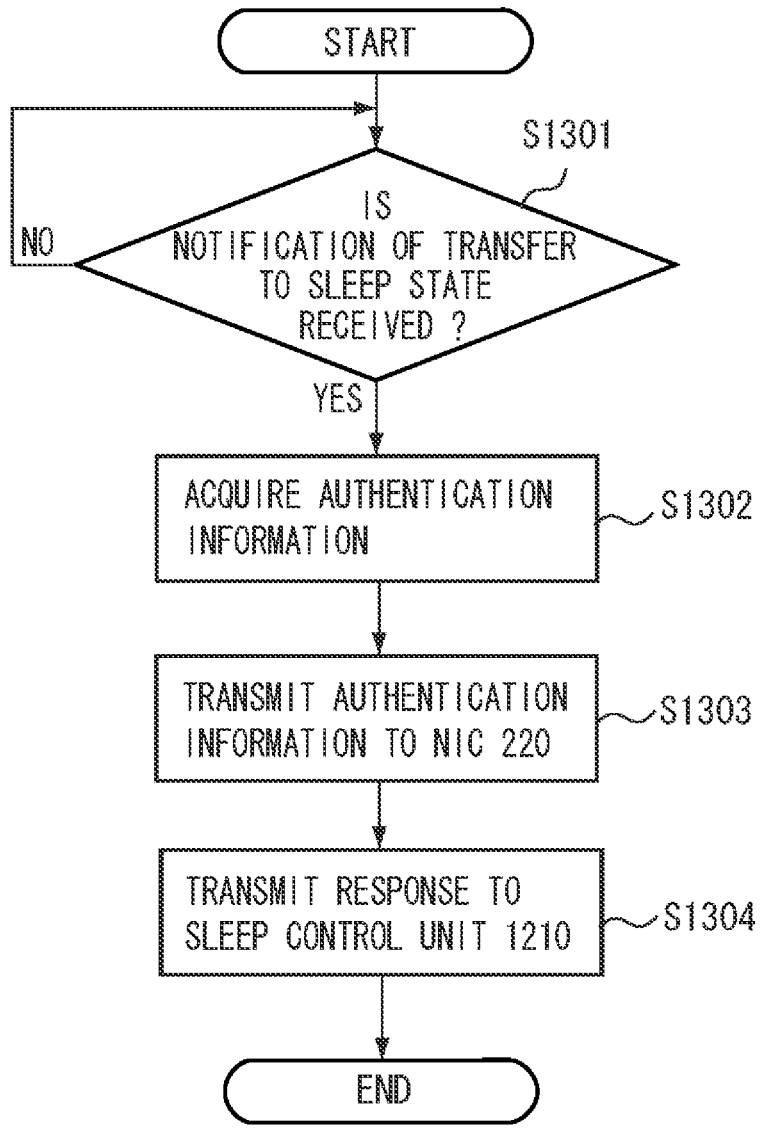

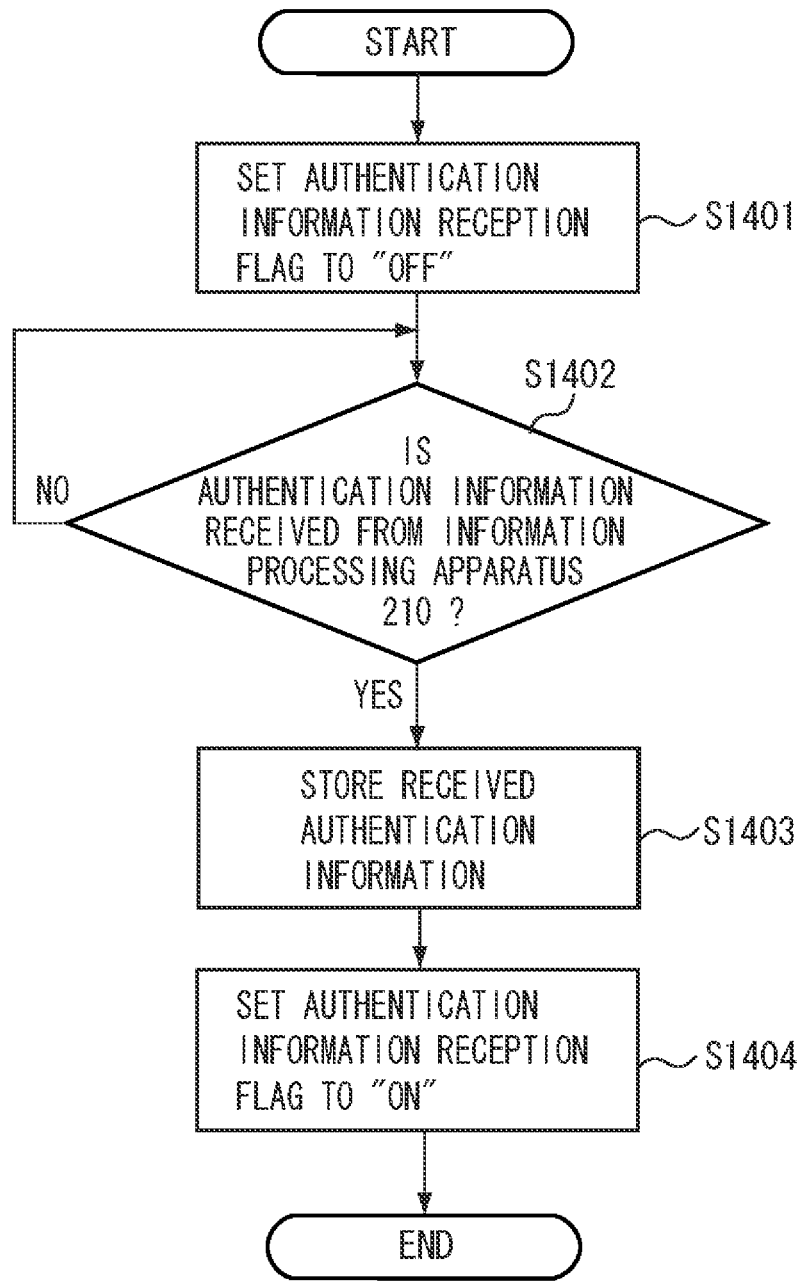

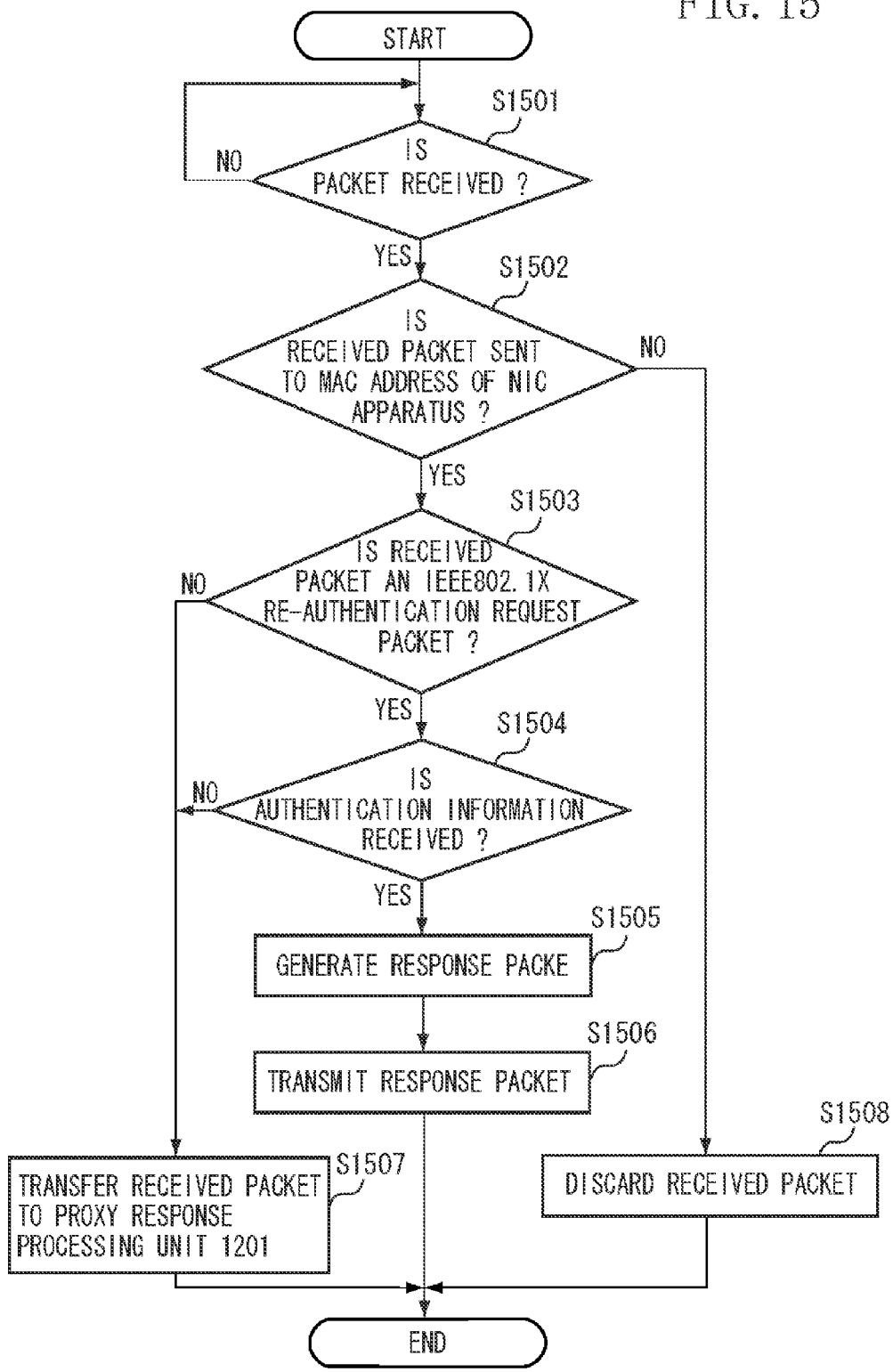

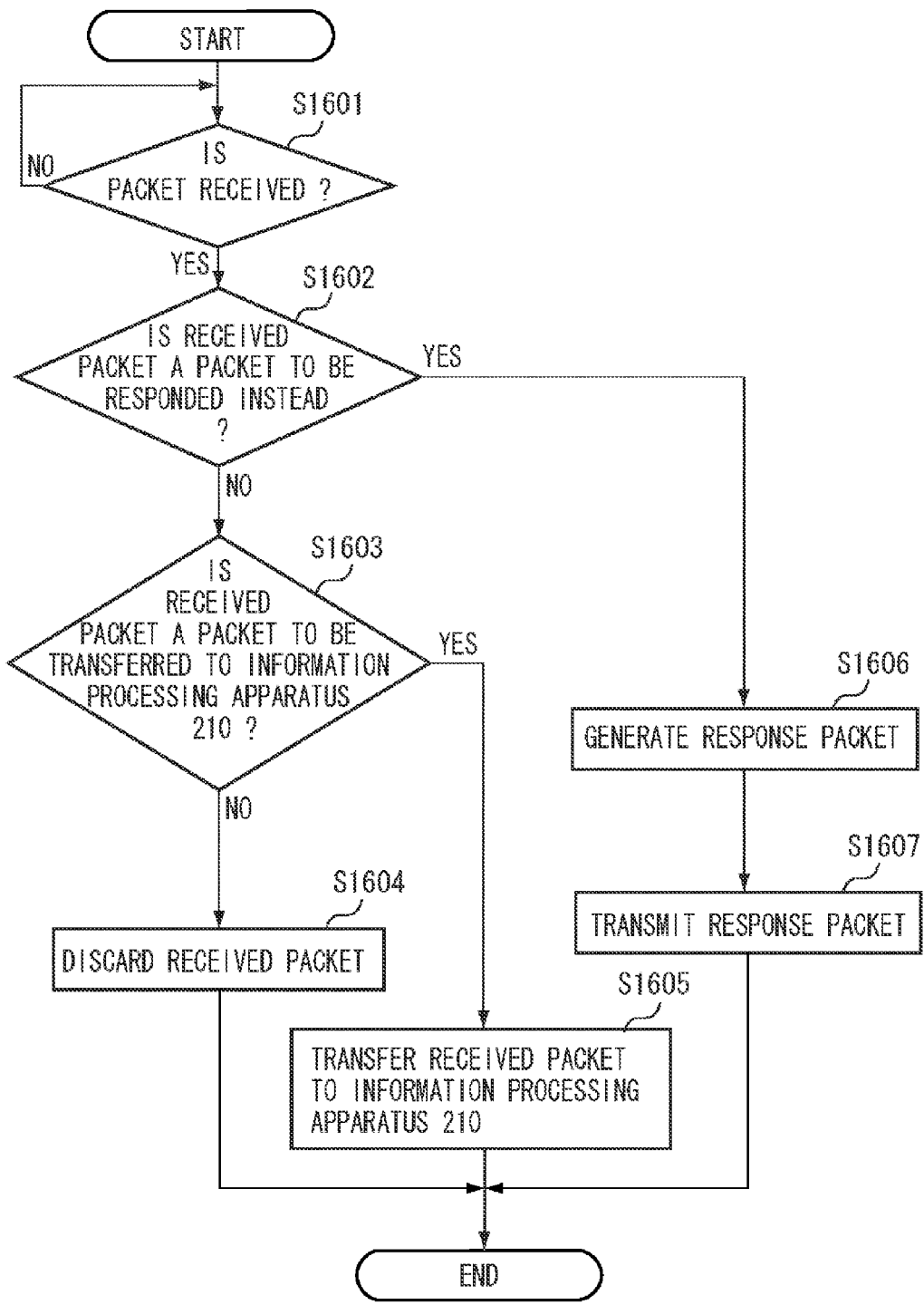

INFORMATION PROCESSING APPARATUS, NETWORK INTERFACE APPARATUS, METHOD OF CONTROLLING BOTH, AND STORAGE MEDIUM

BACKGROUND OF THE INVENTION

1. Field of the Invention

The present invention relates to an information processing apparatus which is connected to a network via a network interface and communicable with an external apparatus.

2. Description of the Related Art

Conventionally, an information processing system which has a power saving mode for minimizing power consumption on standby has been known. As an example of such an information processing system, there is a communication system including an information processing apparatus on the main body side provided with a main central processing unit (CPU) and a network interface card (NIC) apparatus provided with a sub CPU. In general, such a communication system brings the information processing apparatus on the main body side into a power saving mode during the power saving mode and each module of the NIC apparatus which uses less power stands by while being supplied with a normal electric power.

Japanese Patent Application Laid-Open No. 2006-259906 discusses that, when a normal power mode is transferred to a power saving mode to stop supplying the main CPU with electric power, the main CPU notifies the sub CPU of an address of a multicast packet to be responded. This allows the sub CPU to respond instead of the main CPU when the sub CPU receives a multicast packet when the supply of the electric power to the main CPU stopped, which eliminates need for starting the main CPU. In other words, a stoppage in supplying the electric power to the main CPU can be continued longer to increase an effect of power saving.

In recent years, as a technique for encrypting a network path in order to protect confidential information, an encryption system such as Internet protocol security (IPSec) and secure socket layer (SSL) has been known. The use of these techniques can transfer data via a network with data encrypted and prevent leakage of information.

As a standard for authentication used in the connection of a system to a local area network (LAN), an 802.1X is known. The 802.1X limits connection by authentication to prevent a terminal device other than a predetermined terminal device from connecting a system to a computer network.

As described above, information about a packet to be responded when the information processing apparatus on the main body side is brought into a power saving mode is registered into the NIC apparatus to allow the NIC apparatus to respond to a received packet instead of the information processing apparatus on the main body side.

When the NIC apparatus responds instead of the information processing apparatus on the main body side, if a packet transmitted via the network is encrypted, the NIC apparatus may not be able to adequately respond.

In other words, when the NIC apparatus is caused to respond instead of the information processing apparatus on the main body side, a pattern of the packet to be responded by the NIC apparatus and a packet to be transmitted as a response to the packet matching with the pattern are registered into the NIC apparatus. This means that the NIC apparatus which receives the packet matching with the registered pattern transmits the packet corresponding to the pattern. If the packet received by the NIC apparatus is encrypted and then the encrypted packet is compared with the registered pattern, it is determined that the content does not match with the registered pattern even if the content of the packet matches with the registered pattern.

In this case, the information processing apparatus on the main body side is returned from the power saving mode to the normal power mode and the packet received by the NIC apparatus is to be transferred to the information processing apparatus on the main body side. Thus, this increases the number of times that the information processing apparatus on the main body side is returned from the power saving mode to the normal power mode and the effect of saving power is lessened.

The NIC apparatus may include a configuration for encryption and decryption processing similar to the information processing apparatus on the main body side, which, however, may cause the following situation.

When the information processing apparatus on the main body side executes an encrypted communication, the information processing apparatus on the main body side previously performs negotiation with an external apparatus which is the other party for the encrypted communication to acquire and store information to execute the encrypted communication. The stored information is used when the information processing apparatus on the main body side executes the encrypted communication.

However, if the information processing apparatus on the main body side is switched to the power saving mode and the NIC apparatus executes the encrypted communication with an external apparatus, the NIC apparatus is to perform again the negotiation with the external apparatus. Such processing may cause a situation in that both the NIC and the external apparatus are subjected to an unnecessary load and a time-consuming negotiation decreases communication efficiency.

Further, a generally NIC apparatus is poorer in hardware configuration (processing efficiency of CPU and memory capacity) than the information processing apparatus on the main body side. Therefore, it may be difficult for the NIC apparatus to be equipped with a configuration for performing the negotiation with the external apparatus as well as a configuration for performing the encryption and the decryption processing.

This applies to an authentication system such as 802.1X. If the information processing apparatus on the main body side is switched to the power saving mode and the NIC apparatus communicates with the external apparatus instead of the information processing apparatus on the main body side, the negotiation is again to be performed between the NIC apparatus and the external apparatus.

SUMMARY OF THE INVENTION

According to an aspect of the present invention, an apparatus includes a storage unit configured to store information which is acquired by a negotiation with an external apparatus and is for communication via a network, a detection unit configured to detect that conditions are satisfied for switching to a power saving mode in which power consumption is smaller than in a normal power mode while the normal power mode is operating, and a notification unit configured to notify a network interface of the stored information when the conditions for switching to the power saving mode are satisfied.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 3 is a block diagram illustrating a software configuration of the communication system.

FIG. 4 is a table illustrating an example of security association (SA) information used in IPSec communication.

FIG. 5 is a flow chart describing an operation of an information processing apparatus.

FIG. 13 is a flow chart describing the operation of the information processing apparatus.

FIG. 14 is a flow chart describing the operation of the NIC.

FIG. 15 is a flow chart describing the operation of the NIC.

FIG. 16 is a flow chart describing the operation of the NIC.

DESCRIPTION OF THE EMBODIMENTS

Various exemplary embodiments, features, and aspects of the invention will be described in detail below with reference to the drawings.

The following exemplary embodiments do not limit the invention according to the claims and all the combinations of characteristics described in the exemplary embodiments are not limited as means for solution of the invention.

A first exemplary embodiment describes processing in the case where a communication system executes an encrypted communication. As an example of the encrypted communication, a case is described in which Internet protocol security (IPSec) is used to communicate.

The IPSec is a protocol for preventing data which flows on a network from being tapped or altered using a specific authentication algorithm or encryption algorithm. The IPSec includes two protocols of authentication header (AH) and encapsulations security payload (ESP). The AH performs only authentication and the ESP performs authentication and encryption. It is determined which protocol is used and which type of the authentication algorithm or the encryption algorithm is used by negotiation before IPSec communication is started. It is defined that a key used in the authentication algorithm is exchanged between communication terminals using Internet key exchange (IKE) before IPSec communication is started. Request for comment (RFC) defines the detail of the IPSec and IKE including a packet format.

Figure 1:
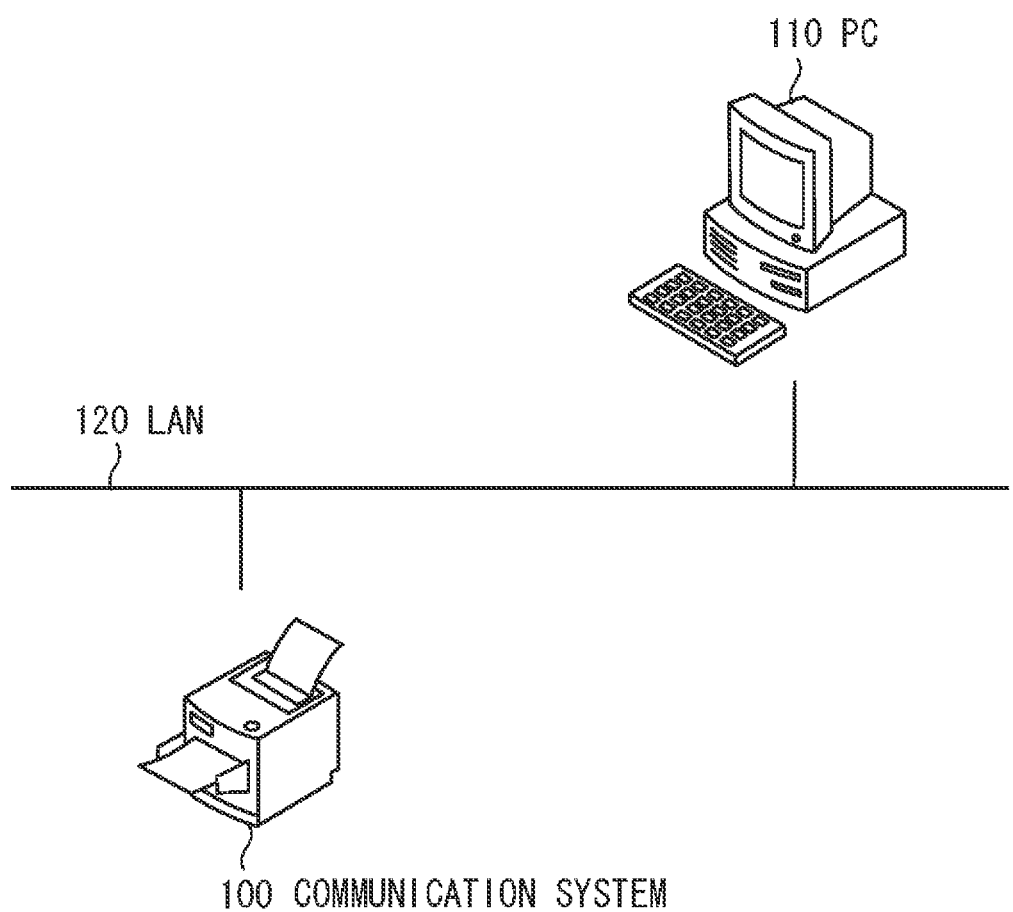
FIG. 1 is a general schematic diagram of a network including a communication system.

FIG. 1 is a general schematic diagram of a network which includes a communication system 100. The communication system 100 is connected to a personal computer (PC) 110 via a LAN 120 and both are communicable with each other. The communication system 100 and the PC 110 are provided with a configuration for executing an IPSec communication. The IPSec is applied to all communications between the communication system 100 and the PC 110.

Figure 2:
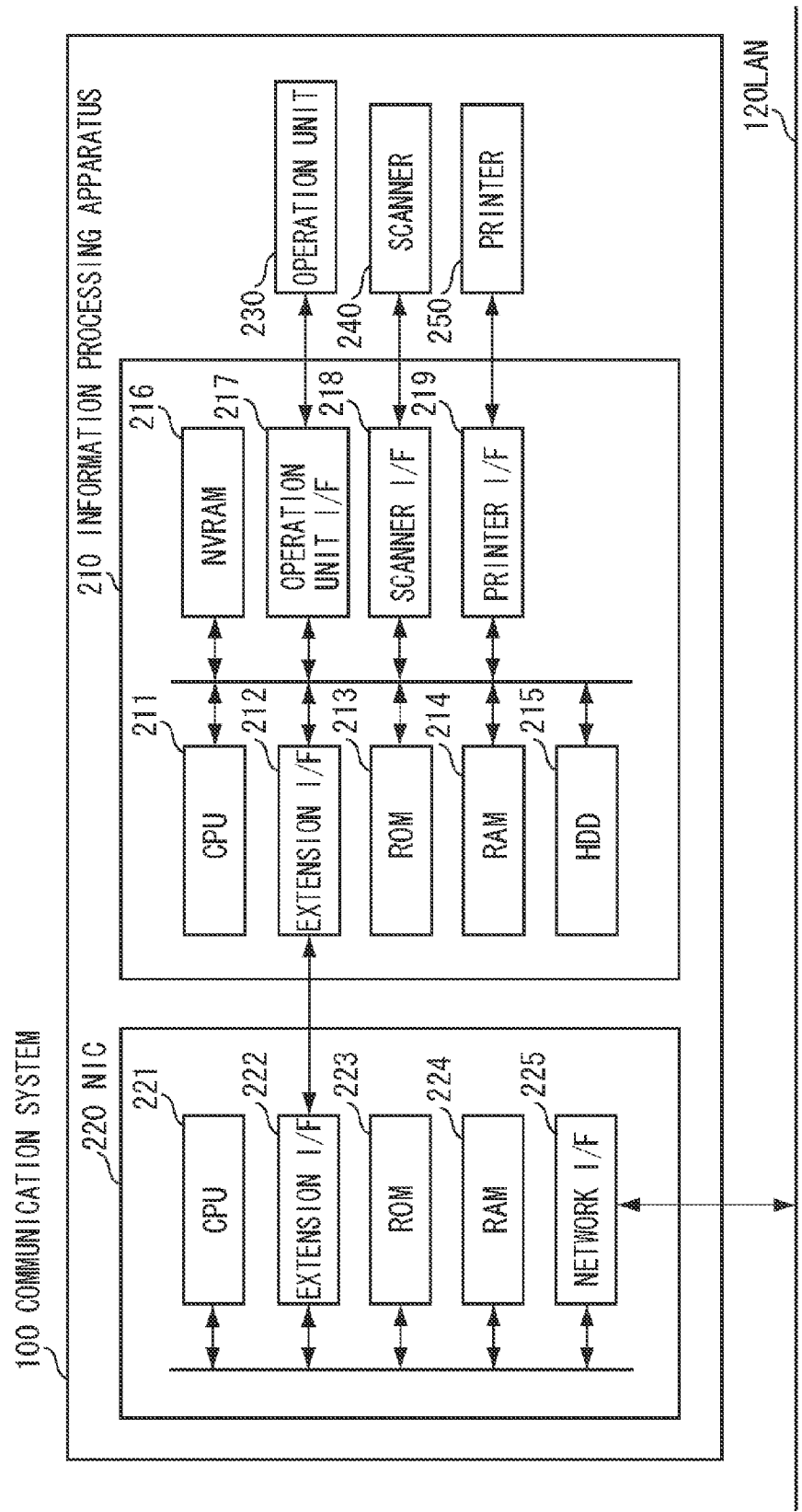
FIG. 2 is a block diagram illustrating a hardware configuration of the communication system.

FIG. 2 is a block diagram illustrating a hardware configuration of the communication system 100. The communication system 100 includes an information processing apparatus 210 and an NIC 220. The information processing apparatus 210 is connected to the LAN 120 via the NIC 220.

A CPU 211 executes software program of the information processing apparatus 210 to control the entire apparatus. A random access memory (RAM) 214 is used for temporarily storing data when the CPU 211 controls the apparatus. A read only memory (ROM) 213 stores a boot program of the apparatus and fixed parameters.

A hard disk drive (HDD) 215 is used for storing various pieces of data. A nonvolatile random access memory (NVRAM) 216 stores various setting values of the information processing apparatus 210. An operation unit interface (I/F) 217 controls an operation unit 230, causes a liquid crystal panel provided on the operation unit 230 to display various operation screens and transmits a user's instruction inputted via the operation screen to the CPU 211.

A scanner I/F 218 controls a scanner 240. The scanner 240 reads an image on a document to generate image data. A printer I/F 219 controls a printer 250. The printer 250 prints an image based on the image data on a recording medium. An extension I/F 212 is connected to an extension I/F 222 on the NIC 220 side and controls data communication with an external apparatus (PC 110) on the LAN 120 via the NIC 220.

The CPU 221 executes the software program of the NIC 220 to control the entire apparatus. A RAM 224 is used for temporarily storing data when the CPU 221 controls the apparatus. A ROM 223 stores a boot program of the apparatus and fixed parameters.

The extension I/F 222 is connected to the extension I/F 212 on the information processing apparatus 210 side and controls data communication between the information processing apparatus 210 and the NIC 220. A network I/F 225 is connected to the LAN 120 and controls the data communication between the NIC 220 (the information processing apparatus 210 and the communication system 100) and the external apparatus (PC 110) on the LAN 120.

The information processing apparatus 210 operates in either a normal power mode or a power saving mode in which power consumption is smaller than that in the normal power mode. When the information processing apparatus 210 is switched from the normal power mode to the power saving mode, the supply of electric power to the CPU 211, the HDD 215, the NVRAM 216, and others is stopped. On the other hand, the NIC 220 is operated by an application specific integrated circuit (ASIC) which is different from that of the information processing apparatus 210. Therefore, even when the information processing apparatus 210 is switched to the power saving mode, the supply of electric power to the NIC 220 is continued to realize a proxy response function described later.

FIG. 3 is a block diagram illustrating the software configuration of the communication system 100. A sleep control unit 310 controls switching between the normal power mode and the power saving mode. An IPSec processing unit 309 performs negotiation processing for acquiring information for executing IPSec communication and encryption/decryption processing of a packet transmitted to and received from the external apparatus.

An IPSec control unit 308 controls an IPSec processing unit 309 and stores information for the IPSec processing unit 309 to perform processing related to IPSec. A communication unit between CPUs 307 transmits and receives data to and from the software which is operated on the NIC 220 via the extension I/F 212 and the extension I/F 222. A communication unit between CPUs 306 transmits and receives data to and from the software which is operated on the information processing apparatus 210 via the extension I/F 222 and the extension I/F 212.

An IPSec processing unit 304 performs encryption/decryption processing of a packet transmitted to and received from the external apparatus. As is not the case with the IPSec processing unit 309, the IPSec processing unit 304 does not include a configuration for performing negotiation for acquiring information for executing IPSec communication, however, the IPSec processing unit 304 may be similar to the IPSec processing unit 309 in configuration. An IPSec control unit 303 controls the IPSec processing unit 304 and stores information for the IPSec processing unit 304 to perform processing related to IPSec.

A network I/F control unit 305 controls the transmission and reception of the packet performed by the network I/F 225. The network I/F control unit 305 monitors which mode the information processing apparatus 210 operates in, the normal power mode or the power saving mode. When the information processing apparatus 210 is operated in the normal power mode, the network I/F control unit 305 transfers the packet received from the LAN 120 to the information processing apparatus 210. When the information processing apparatus 210 is operated in the power saving mode, the network I/F control unit 305 transfers the packet received from the LAN 120 to the IPSec processing unit 304.

A proxy response processing unit 301 receives the received packet which is transmitted from the IPSec processing unit 304. The IPSec processing unit 304 receives the packet only while the information processing apparatus 210 is being operated in the power saving mode, so that the proxy response processing unit 301 is also operated only in that case.

The proxy response processing unit 301 classifies the received packets into three types; a "packet to be discarded," a "packet to be transferred to the information processing apparatus 210," and a "packet to be responded instead." The "packet to be discarded" refers to a negligible packet, for example, a packet is not destined for the NIC apparatus (i.e., a packet to which no response is required). If the packets are classified into the packet to be discarded, the received packet is discarded.

The "packet to be transferred to the information processing apparatus 210" refers to a received packet which uses to some processing, but a processing cannot be provided only by the NIC 220. If such a packet is received, the proxy response processing unit 301 causes the information processing apparatus 210 to return from the power saving mode to the normal power mode and transfers the received packet to the information processing apparatus 210.

The "packet to be responded instead" refers to a packet to which the NIC 220 responds instead of the information processing apparatus 210. In this case, the proxy response processing unit 301 encrypts the packet to be transmitted as a response using an IPSec transmission processing library 302 and then transmits the encrypted packet.

The IPSec transmission processing library 302 is a module for supplying an application programming interface (API) and performs encryption processing on the packet delivered from the proxy response processing unit 301 as an in-parameter. The IPSec transmission processing library 302 outputs the encrypted packet together with an API return value as an out-parameter.

FIG. 4 illustrates a security association database (SAD) stored in the RAM 214 of the information processing apparatus 210 and the RAM 224 of the NIC 220. The SAD is a database for storing security association (SA) information. The SA information refers to one-way traffic information of IPSec communication. The SAD is generated by each IPSec control unit and the SA information determined by the IPSec control unit performing negotiation with the external apparatus is set to the SAD.

A security parameter index (SPI) 401 is a value for identifying the SA. An encryption algorithm 402 indicates a type of the encryption algorithm used in this traffic. An authentication algorithm 403 indicates a type of the authentication algorithm used in the traffic. An encryption key 404 indicates key information used for encrypting the traffic. An authentication key 405 indicates key information used for authenticating the traffic. A lifetime type 406 indicates which physical amount is used as an effective period of the SA, time (unit in second) passed after the SA is generated or an amount of data (unit in kilobyte) to be transmitted. A lifetime 407 indicates an actual value of SA lifetime.

An SA generation time 408 indicates time (in seconds passed after the start of the system) when the SA is generated and is used for determining the effectiveness of the SA when time is set to the SA lifetime type 406. An amount of transmission data 409 indicates an amount of data transmitted after the SA is generated and is used for determining the effectiveness of the SA when an amount of data is set to the SA lifetime type 406. A sequence number 410 indicates a value for protecting the SA from replay attack, is set to an IPSec header, and incremented by one each time a packet is transmitted.

A transmission source address 411 indicates a transmission source IP (IPv6) address of the IPSec traffic associated with the SA. A transmission destination address 412 indicates a transmission destination IP (IPv6) address of the IPSec traffic associated with the SA. A transmission source port number 413 indicates a transmission source port number of the IPSec traffic associated with the SA. A transmission destination port number 414 indicates a transmission destination port number of the IPSec traffic associated with the SA. A protocol type 415 indicates a protocol type of the IPSec traffic associated with the SA.

FIGS. 5 to 10 are flow charts describing processing in which the information processing apparatus 210 notifies the NIC 220 of the SA information acquired by the information processing apparatus 210 negotiating with the PC 110 when the information processing apparatus 210 is brought into the power saving mode.

Figure 6:
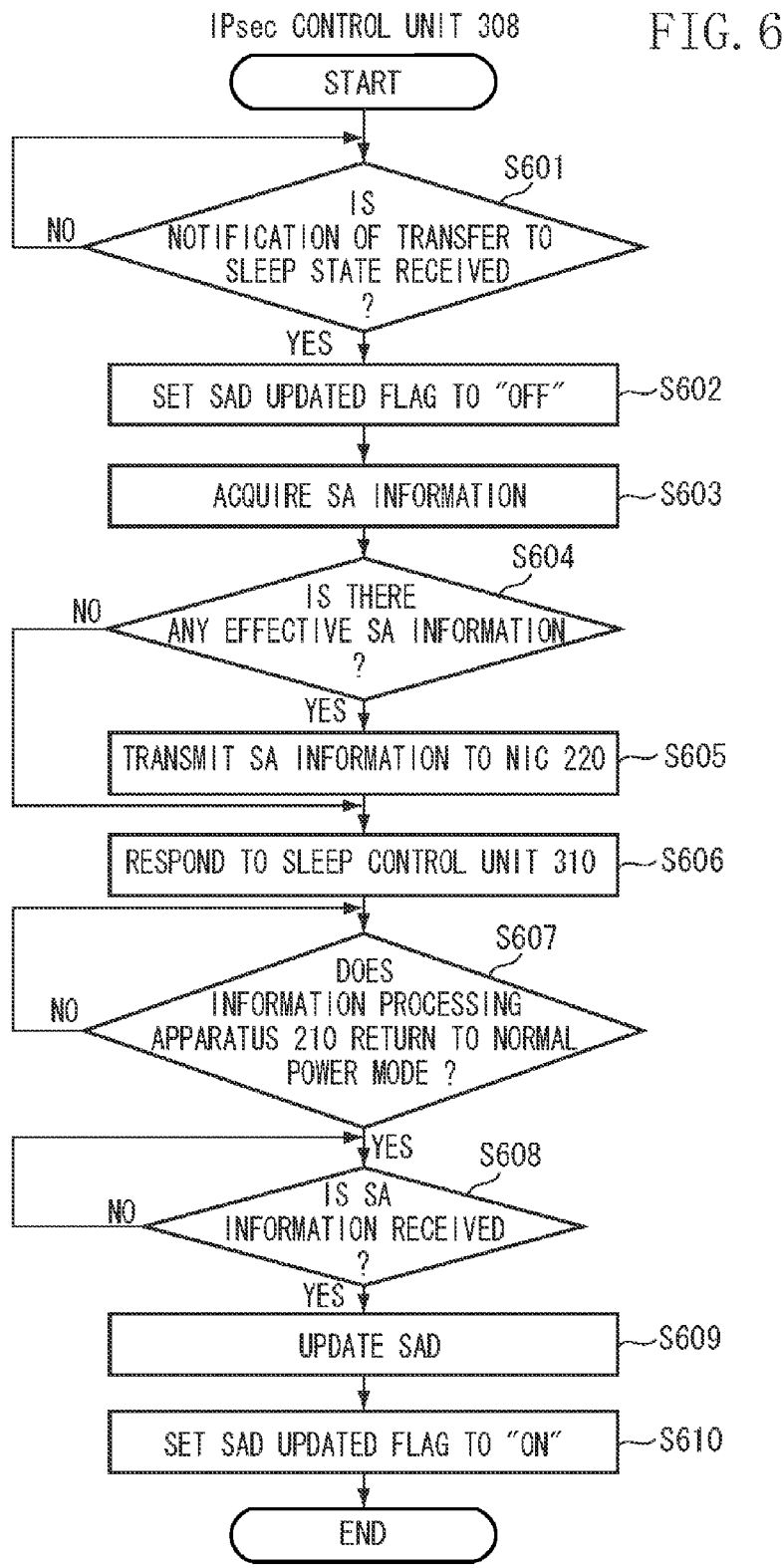
FIG. 6 is a flow chart describing the operation of the information processing apparatus.

Each operation (step) illustrated in the flow charts of FIGS. 5 and 6 is realized by the CPU 211 of the information processing apparatus 210 executing a control program. Each operation (step) illustrated in the flow charts of FIGS. 7 to 10 is realized by the CPU 221 of the NIC 220 executing a control program.

The operation of the sleep control unit 310 is described below with reference to FIG. 5. The sleep control unit 310 executes each processing illustrated in the flowchart of FIG. 5 when the sleep control unit 310 detects that the information processing apparatus 210 satisfies conditions for switching to the power saving mode.

In step S501, the sleep control unit 310 inquires each of previously registered software modules of whether the information processing apparatus 210 can be switched to sleep state to check whether the switching to the sleep state does not cause any issue. In the present exemplary embodiment, the IPSec control unit 308 is registered as an inquiry target as to whether the information processing apparatus 210 can be switched to the sleep state. The information processing apparatus 210 cannot be switched the sleep state while the IPSec processing unit 309 is negotiating with the external apparatus, for example.

As described above, in the communication system 100, the IPSec processing unit 304 of the NIC 220 does not include a configuration for negotiating with the external apparatus. This aims to minimize power consumption on standby by simplifying the configuration of the NIC 220 because the supply of electric power to the NIC 220 is continued even after the information processing apparatus 210 is brought into the power saving mode.

In step S502, the sleep control unit 310 determines whether the information processing apparatus 210 can be switched to the sleep state based on a response to the inquiry as to whether the information processing apparatus 210 can be switched to the sleep state. If the information processing apparatus 210 can be switched to the sleep state (YES in step S502), the processing proceeds to step S504, otherwise (NO in step S502), the processing proceeds to step S503. In step S503, the processing waits until a predetermined time period elapses and returns to the step S501 again.

In step S504, the sleep control unit 310 notifies the IPSec control unit 308 of the switching to the sleep state. In step S505, the sleep control unit 310 stands by until the sleep control unit 310 receives a response from a module (the IPSec control unit 308) notified of the switching to the sleep state. If the sleep control unit 310 receives the response from the IPSec control unit 308 (YES in step S505), then in step S506, the information processing apparatus 210 is switched to the sleep state (power saving mode) and the processing is ended.

The operation of the IPSec control unit 308 is described below with reference to FIG. 6. In step S601, the IPSec control unit 308 stands by until the sleep control unit 310 notifies the IPSec control unit 308 of the switching to the sleep state.

If the sleep control unit 310 notifies the IPSec control unit 308 of the switching to the sleep state (YES in step S601), then the processing proceeds to step S602, an SAD updated flag is set to OFF. The SAD updated flag is stored in an area secured on the RAM 214. The IPSec processing unit 309 refers to this flag and stops processing if the flag is set to OFF until it is turned to ON.

In step S603, the IPSec control unit 308 acquires SA information stored in the RAM 214. In step S604, the IPSec control unit 308 determines whether there is any effective SA information in the information acquired in step S603. If there is any effective SA information (YES in step S604), the processing proceeds to step S605 and the IPSec control unit 308 notifies the NIC 220 of the SA information via the communication unit between CPUs 307.

In step S606, the IPSec control unit 308 transmits a response to the sleep control unit 310. Thereafter, the information processing apparatus 210 is brought into the sleep mode, so that the IPSec control unit 308 stops the operation.

In step S607, the IPSec control unit 308 determines whether the information processing apparatus 210 is returned to the normal power mode from the power saving mode. If the information processing apparatus 210 is returned to the normal power mode (YES in step S607), then in step S608, the IPSec control unit 308 determines whether the SA information is received from the NIC220.

If the information processing apparatus 210 receives the SA information from the NIC220 (YES in step S608), the processing proceeds to step S609 and the SA information stored in the RAM 214 is updated using the received SA information. In step S610, the SAD updated flag indicating that the update of the SA information is completed is set to ON.

Figure 7:
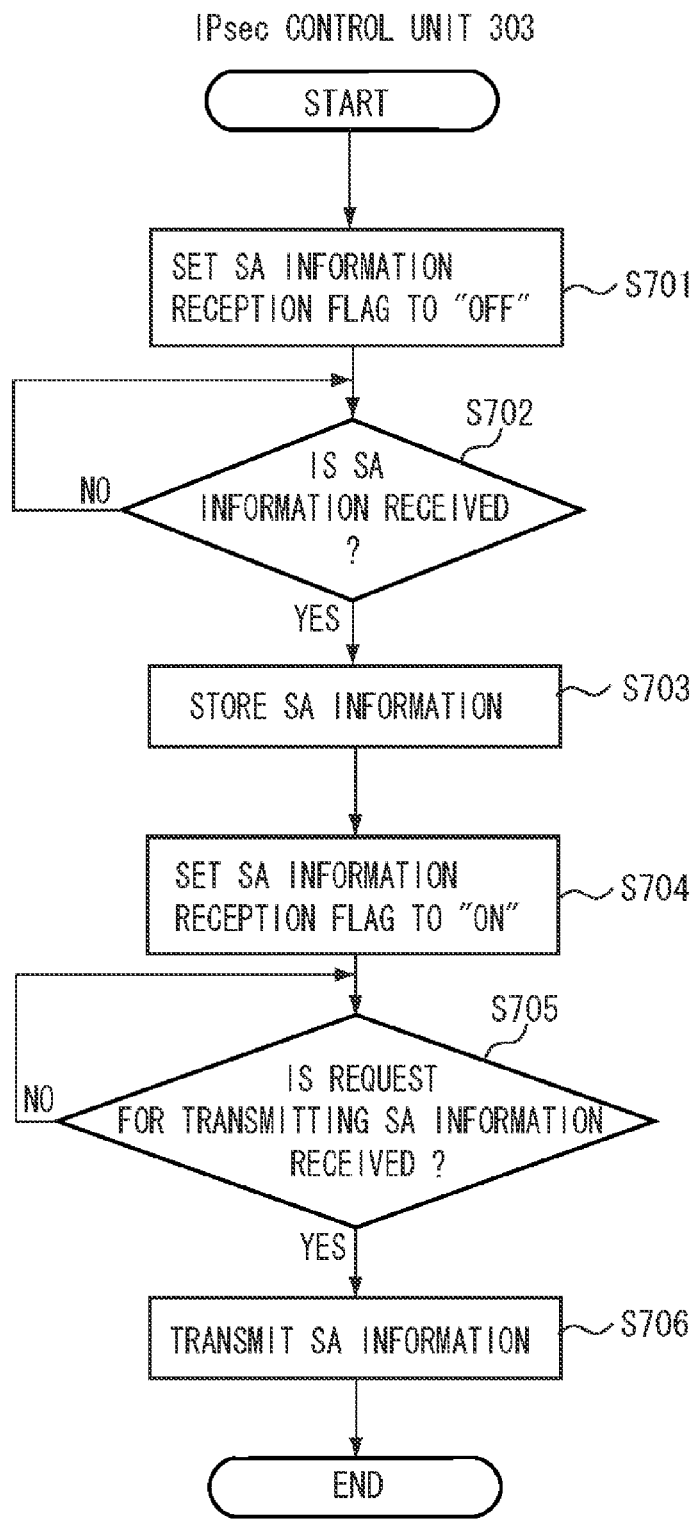
FIG. 7 is a flow chart describing an operation of an NIC.

FIG. 7 illustrates the operation of the IPSec control unit 303 of the NIC 220. In step S701, the IPSec control unit 303 sets an SA information reception flag to OFF. The SA information reception flag is stored in an area secured on the RAM 224. The IPSec processing unit 304 refers to this flag.

In step S702, the IPSec control unit 303 waits to receive the SA information from the information processing apparatus 210. If the IPSec control unit 303 receives the SA information (YES instep S702), the processing proceeds to step S703. The IPSec control unit 303 secures an SAD area on the RAM 224 and stores the received SA information therein. The processing proceeds to step S704 and the IPSec control unit 303 sets the SA information reception flag set to OFF in step S701 to ON. Instep S705, the IPSec control unit 303 stands by until it receives a request for transmitting the SA information.

The request for transmitting the SA information is transmitted by the network I/F control unit 305 which monitors the operation mode (i.e., the normal power mode or the power saving mode) of the information processing apparatus 210 when the network I/F control unit 305 recognizes that the information processing apparatus 210 is returned to the normal power mode. If the IPSec control unit 303 determines that the request for transmitting the SA information is received (YES instep S705), the processing proceeds to step S706. In step S706, the IPSec control unit 303 transmits the SA information stored in the RAM 224 to the information processing apparatus 210 via the communication unit between CPUs 306.

Figure 8:
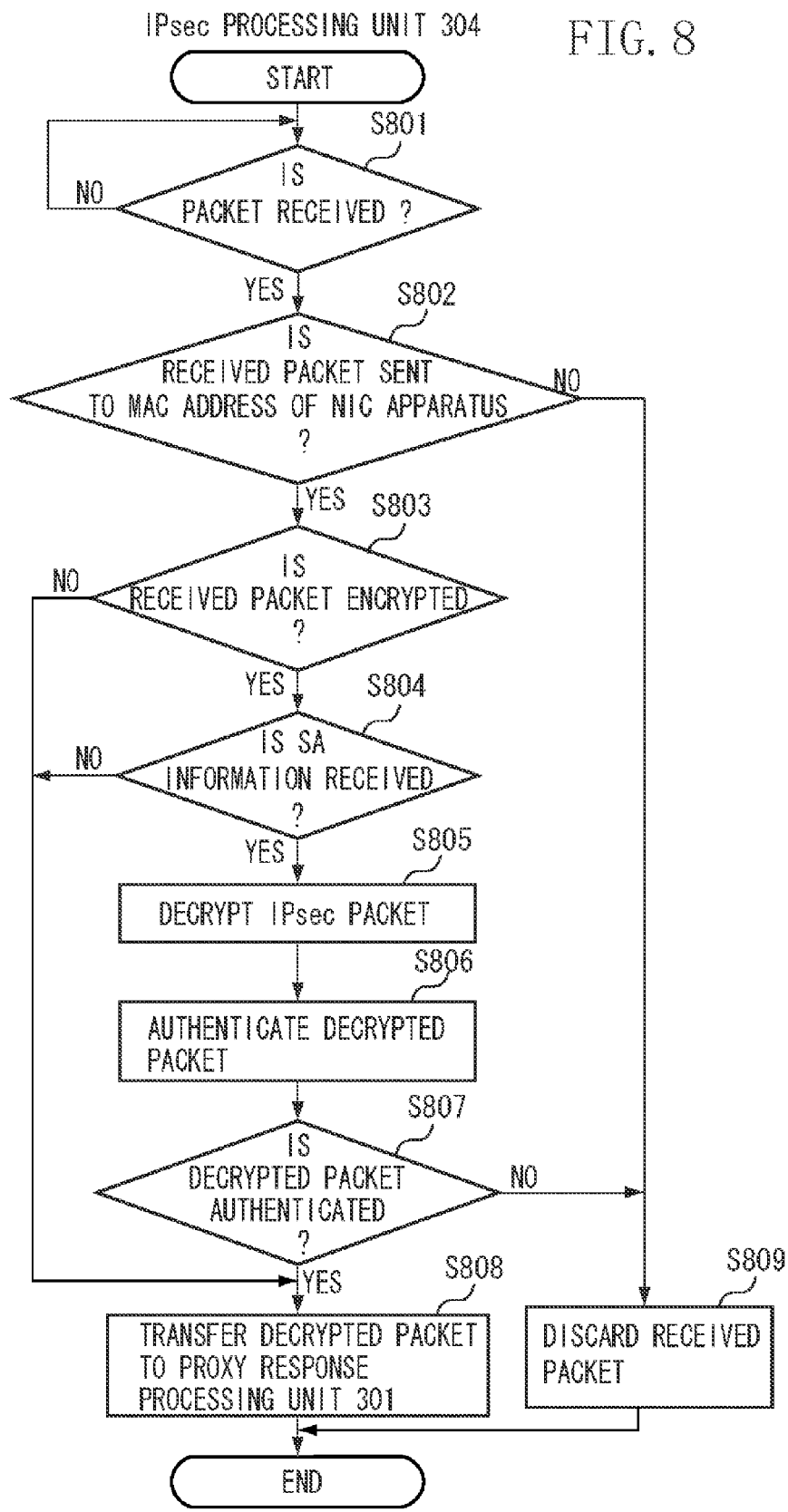
FIG. 8 is a flow chart describing the operation of the NIC.

FIG. 8 illustrates the operation of the IPSec processing unit 304 of the NIC 220. In step S801, the IPSec processing unit 304 stands by until the packet received from the LAN 120 is transferred from the network I/F control unit 305. If the packet is received (YES in step S801), the processing proceeds to step S802 and the IPSec processing unit 304 refers to an Ethernet frame portion of the received packet to determine whether the received packet is sent to the MAC address of the NIC apparatus 220.

If it is determined that the received packet is not sent to the MAC address of the NIC apparatus 220 (NO in step S802), the processing proceeds to step S809, the received packet is discarded, and the processing is ended.

On the other hand, if the received packet is sent to the MAC address of the NIC apparatus 220 (YES in step S802), the processing proceeds to step S803. In step S803, the IPSec processing unit 304 determines whether the received packet is the IPSec packet (or the received packet is encrypted) based on whether a header next to the Ethernet frame is an IPSec header (ESP header or AH header). If it is determined that the received packet is not the IPSec packet (NO in step S803), then in step S808, the IPSec processing unit 304 transfers the received packet to the proxy response processing unit 301, and the processing is ended.

If the received packet is the IPSec packet (YES in step S803), then in step S804, the IPSec processing unit 304 determines whether the SA information is received with reference to the SA information reception flag on the RAM 224.

If the SA information is not received (NO in step S804), then in step S808, the IPSec processing unit 304 transfers the received packet to the proxy response processing unit 301 and the processing is ended. Because of the absence of the SA information for the IPSec communication, the IPSec is to perform negotiation, however, the NIC 220 cannot executes the negotiation as described above (because it does not support).

If it is determined that the SA information is received (YES in step S804), in step S805, the IPSec packet is decrypted based on the SA information stored in the RAM 224. However, if the AH header is provided for the IPSec packet as the IPSec header, the IPSec packet is not encrypted, so that the decryption processing is not required.

In step S806, the decrypted packet is subjected to authentication processing based on the SA information stored in the RAM 224. In step S807, a result of the authentication processing is determined. If the result of the processing is negative (NO in step S807), it is determined that the received packet is false and the processing proceeds to step S809. In step S809, the received packet is discarded, and the processing is ended. If the result of the processing is acceptable (YES in step S807), in step S808, a clear received packet in which the IPSec header and the authentication data are deleted is transferred to the proxy response processing unit 301 and the processing is ended.

Figure 9:
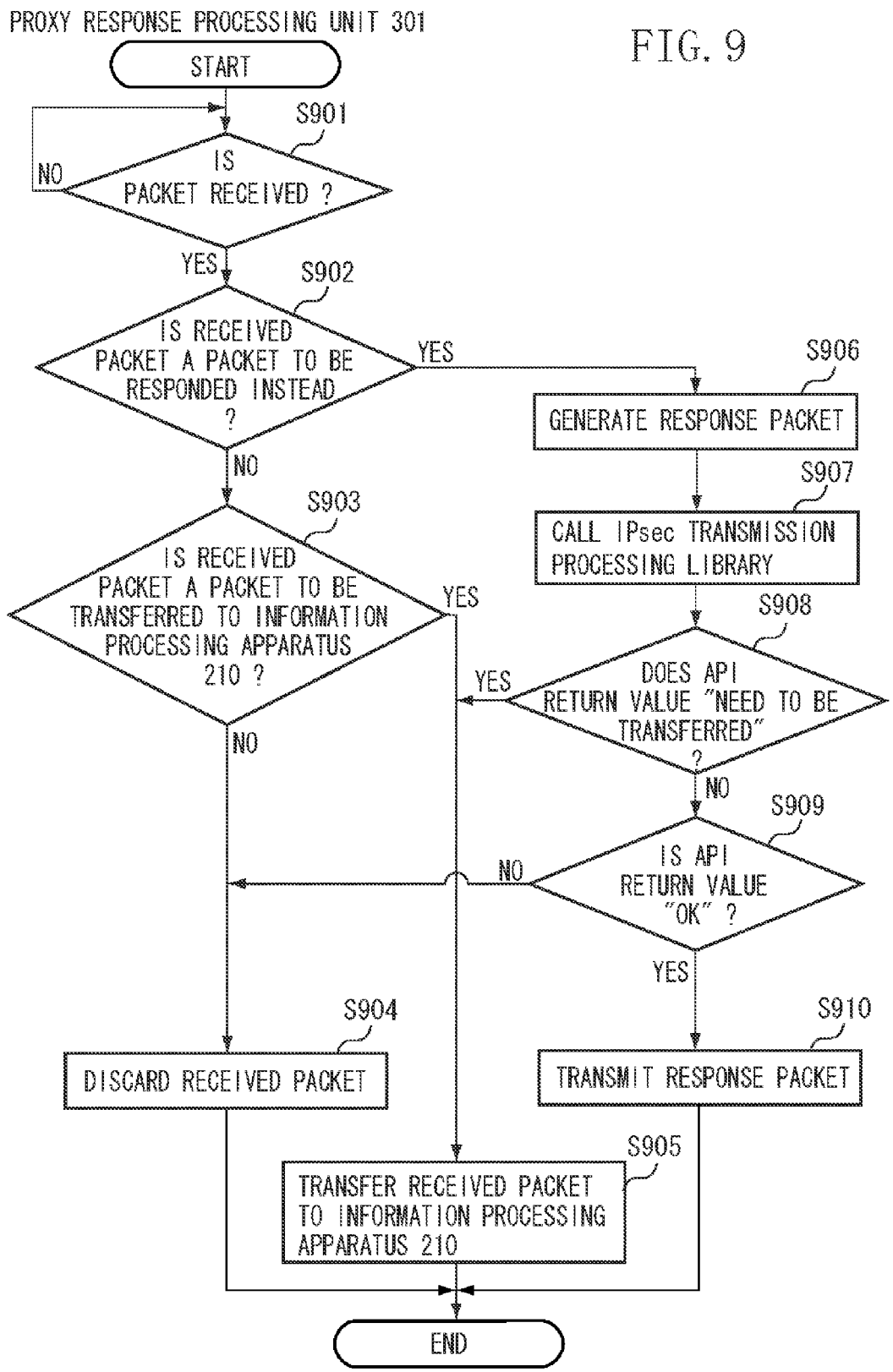
FIG. 9 is a flow chart describing the operation of the NIC.

FIG. 9 illustrates the operation of the proxy response processing unit 301. In step S901, the proxy response processing unit 301 stands by until it receives the packet transferred from the IPSec processing unit 304. If the packet is received (YES instep S901), the processing proceeds to step S902 and the proxy response processing unit 301 determines whether the received packet is the "packet to be responded instead."

The above determination is made based on packet pattern information of which the information processing apparatus 210 notified the NIC 220 before the information processing apparatus 210 is switched to the power saving mode. More specifically, the information processing apparatus 210 notifies the NIC 220 of a reception packet pattern for identifying the packet to be responded by the NIC 220 and a transmission packet to be transmitted as a response while the information processing apparatus 210 is operating in the power saving mode and registers them. When the NIC220 receives the packet coinciding with the reception packet pattern, the proxy response processing unit 301 determines that the packet is the "packet to be responded instead" (YES in step S902) and the processing proceeds to step S906.

If the proxy response processing unit 301 determines that the received packet is not the "packet to be responded instead" (NO in step S902), the processing proceeds to step S903 and the proxy response processing unit 301 determines whether the received packet is the "packet to be transferred to the information processing apparatus 210." As is the case with the determination in step S902, the determination is made based on packet pattern information of which the information processing apparatus 210 notified the NIC 220 before the information processing apparatus 210 is switched to the power saving mode.

If the proxy response processing unit 301 determines that the received packet is the "packet to be transferred to the information processing apparatus 210" (YES in step S903), the processing proceeds to step S905 and the received packet is transferred to the information processing apparatus 210. On the other hand, if the proxy response processing unit 301 determines that the received packet is not the "packet to be transferred to the information processing apparatus 210" (NO in step S903), the processing proceeds to step S904 and the received packet is discarded.

In step S906, the proxy response processing unit 301 generates a response packet to be transmitted as a response to the received packet. Then in step S907, the proxy response processing unit 301 calls the IPSec transmission processing library 302 and transfers the received packet thereto as an in-parameter.

In step S908, the proxy response processing unit 301 determines whether the API return value from the IPSec transmission processing library 302 "needs to be transferred." If the API return value "needs to be transferred" (YES in step S908), the processing proceeds to step S905 and the received packet is transferred to the information processing apparatus 210. If the API return value does not "need to be transferred" (NO in step S908), the processing proceeds to step S909 and the proxy response processing unit 301 determines whether the API return value from the IPSec transmission processing library 302 is "OK" (i.e. acceptable).

If it is determined that the API return value is "OK" (YES in step S909), in step S910, the response packet is transmitted to the external apparatus, otherwise (NO in step S909), the processing proceeds to step S904 and the received packet is discarded.

Figure 10:
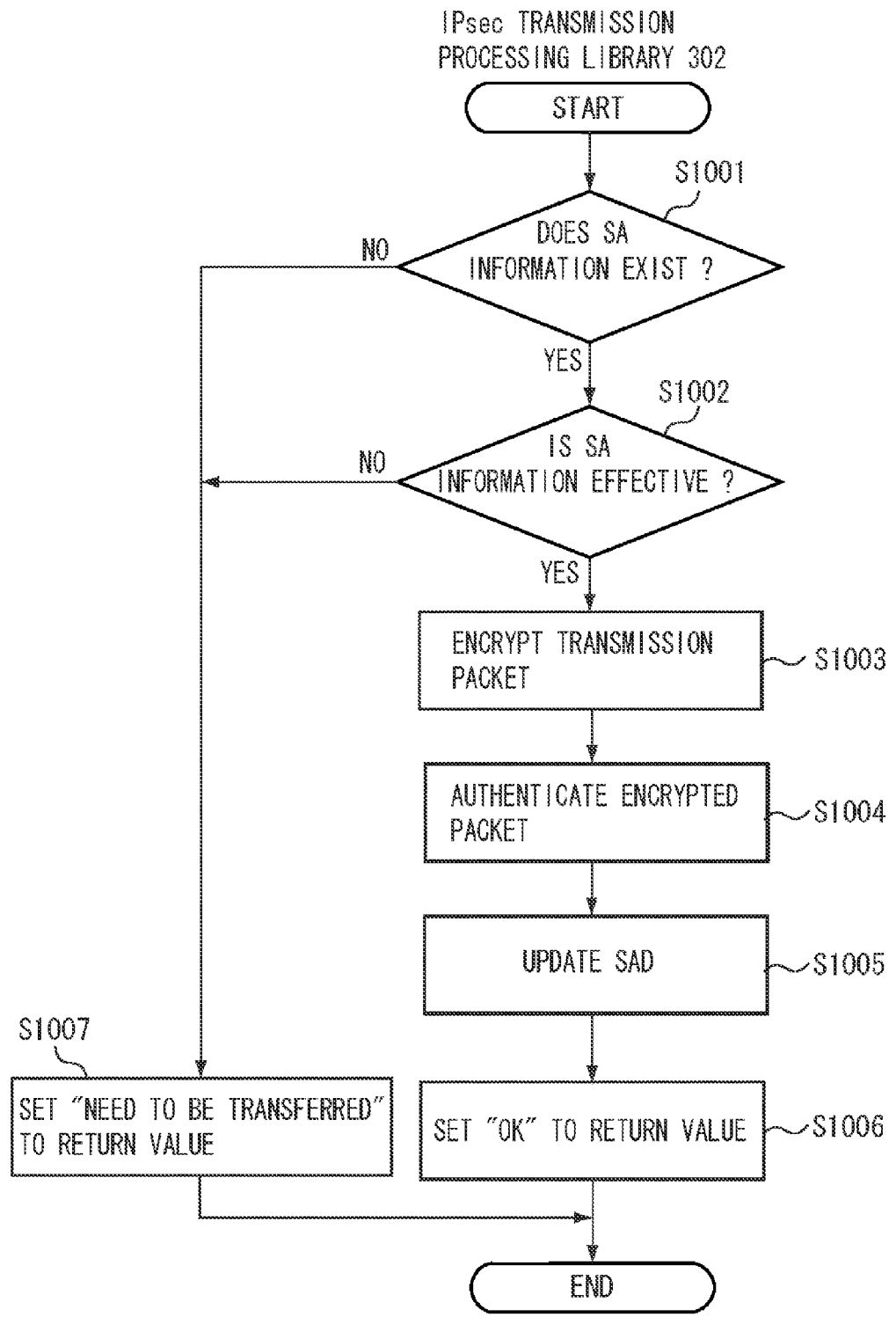
FIG. 10 is a flow chart describing the operation of the NIC.

FIG. 10 illustrates the process flow of the IPSec transmission processing library 302 of the NIC220. The IPSec transmission processing library 302 provides the proxy response processing unit 301 with API. The flow illustrates processing when the API is called.

As described above, the proxy response processing unit 301 delivers the generated packet to the IPSec transmission processing library 302 as the in-parameter of the API to perform the IPSec processing of the response packet (to encrypt the response packet).

In step S1001, the IPSec transmission processing library 302 determines whether the SA information corresponding to the transmission source address, the transmission destination address, the transmission source port number, the transmission destination port number, and the protocol type of the packet delivered as arguments of the API exists in the SAD on the RAM 224. If the corresponding SA information does not exist (NO in step S1001), in step S1007, "need to be transferred" is set as the return value of the API and the API is ended. If the return value is acquired, the proxy response processing unit 301 causes the information processing apparatus 210 to return from the power saving mode and transfers the received packet to the information processing apparatus 210.

If the corresponding SA information exists (YES in step S1001), then in step S1002, the IPSec transmission processing library 302 determines whether the SA information is effective. It is determined that the SA information is effective if the lifetime thereof does not expire.

If it is determined that the SA information is ineffective (NO instep S1002), the proceeding proceeds to step S1007 and "need to be transferred" is set as the return value of the API and the API is ended. If it is determined that the SA information is effective (YES instep S1002), the proceeding proceeds to steps S1003 and S1004 and the IPSec transmission processing library 302 executes encryption processing and authentication processing of the transmission packet according to the SA information and sets the packet as the out-parameter of the API.

In step S1005, the IPSec transmission processing library 302 updates the SAD. The SAD information updated here is the amount of transmission data 409 and the sequence number 410. In step S1006, "OK" indicating that the IPSec processing is normally finished is set as the API return value and the API is ended. Although not illustrated in the flow chart, if the IPSec processing is not normally finished, "OK" is not set to the API return value.

As described above, the information processing apparatus 210 can notify the network interface apparatus (NIC 220) of the information used for communication (SA information) which is acquired by the information processing apparatus 210 negotiating with the external apparatus (PC110) when the information processing apparatus 210 is brought into the power saving mode.

Therefore, the received packet can be decrypted without the need for the NIC 220 to negotiate again with the external apparatus even if the encrypted packet is transmitted from the external apparatus with the information processing apparatus 210 brought into the power saving mode. In other words, even though the received packet is encrypted, the NIC 220 can respond instead of the information processing apparatus 210 without causing the information processing apparatus 210 to return from the power saving mode.

A second exemplary embodiment of the present invention is described below. The second exemplary embodiment describes processing in the case where the communication system performs an authentication processing using the Institute of Electrical and Electronics Engineers Standards IEEE802.1X and connects with the LAN 120. Although 802.1X is described here as an example of an authentication system, the present exemplary embodiment may be applied to the case where other authentication systems are used. The components similar to those in the first exemplary embodiment are denoted by the same reference numerals and characters and a detailed description thereof is omitted.

The IEEE802.1X operates through cooperation between three components; a supplicant to be authenticated, an authenticator for performing an access control of a terminal based on an authentication result, and an authentication server (RADIUS server) for managing authentication information. In other words, this is a security mechanism in which only the supplicant authenticated by the authentication server is allowed to communicate by the authenticator.

Figure 11:
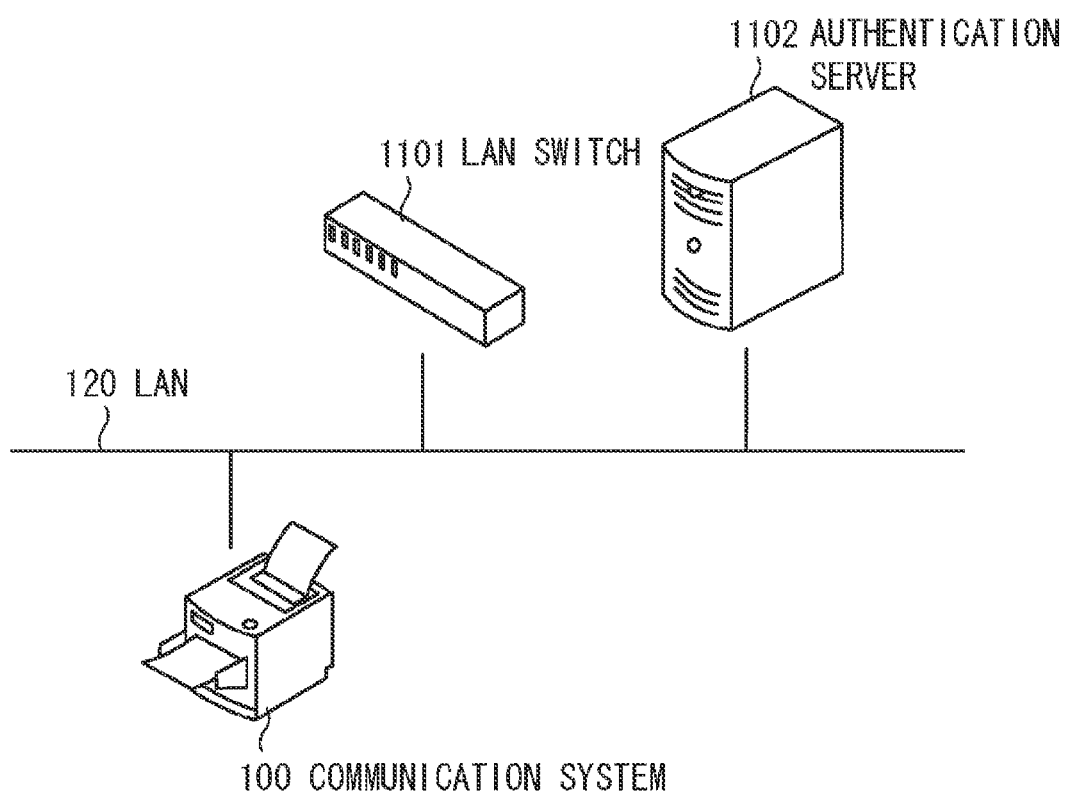
FIG. 11 is a general schematic diagram of a network including a communication system.

FIG. 11 is a general schematic diagram of a network including the communication system 100. The communication system 100, a LAN switch 1101, and an authentication server 1102 are connected with one another via the LAN 120 and mutually communicable. The communication system 100, the LAN switch 1101, and the authentication server 1102 play the roles of the supplicant, the authenticator, and the authentication server (RADIUS server) of the IEEE802.1X respectively.

The communication system 100 executes an IEEE802.1X authentication when it is connected to the LAN 120 at a physical circuit level. The communication system 100 is authenticated by the authentication server 1102 and allowed to communicate with the LAN switch 1101. Even after an initial authentication, the authentication server 1102 requests the communication system 100 to execute the IEEE802.1X authentication again at a fixed time interval. The fixed time interval is based on a value which a manager sets to the authentication server 1102.

Figure 12:
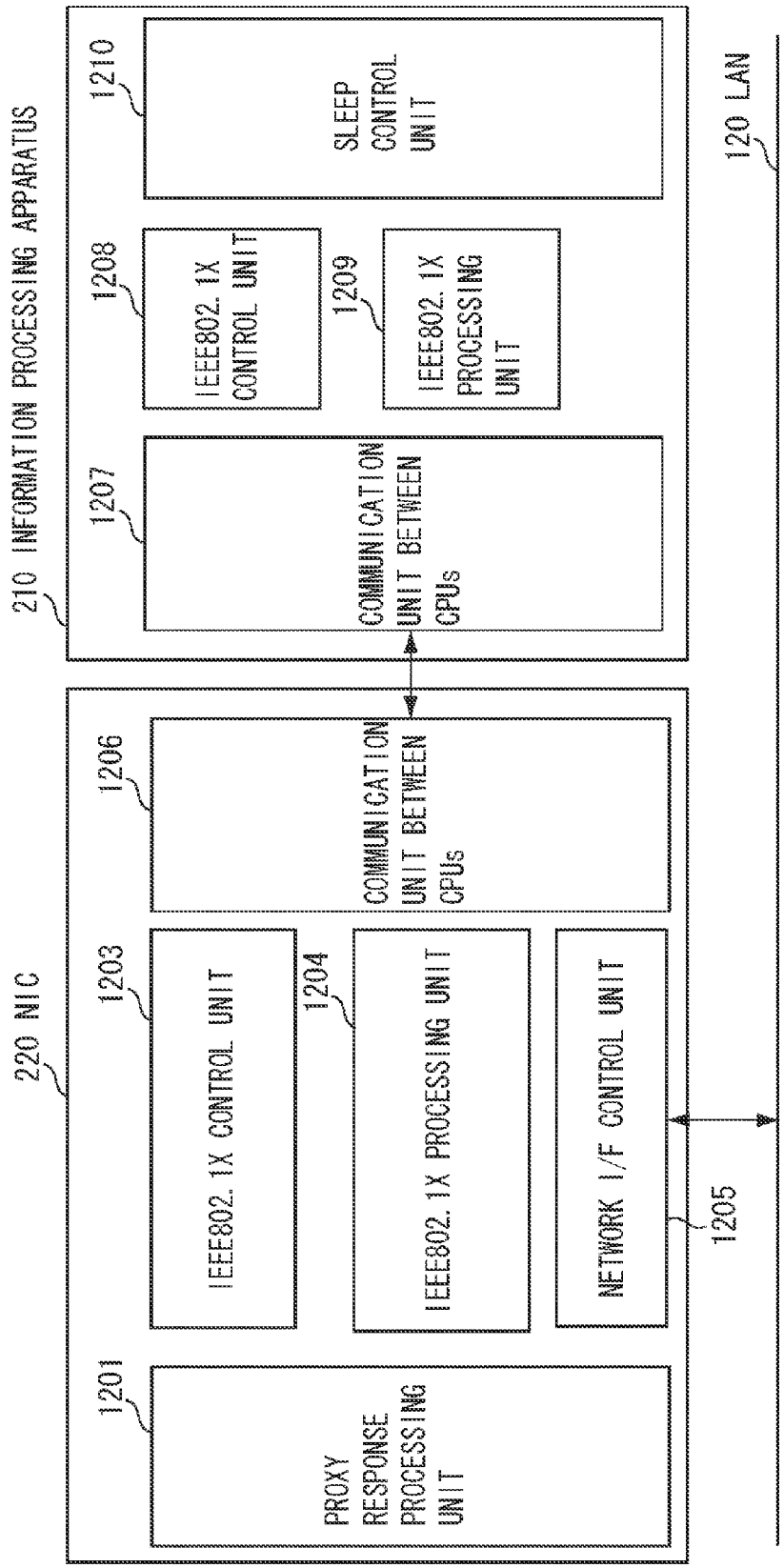
FIG. 12 is a block diagram illustrating the software configuration of the communication system.

FIG. 12 is a block diagram illustrating the software configuration of the communication system 100. A sleep control unit 1210 controls switching between the normal power mode and the power saving mode. An IEEE802.1X processing unit 1209 negotiates with the authentication server 1102 to execute the IEEE802.1X authentication processing, and acquires the authentication result. An IEEE802.1X control unit 1208 controls the IEEE802.1X processing unit 1209.

A communication unit between CPUs 1207 transmits and receives data to and from the software which is operated on the NIC 220 via the extension I/F 212 and the extension I/F 222. A communication unit between CPUs 1206 transmits and receives data to and from the software which is operated on the information processing apparatus 210 via the extension I/F 222 and the extension I/F 212.

An IEEE802.1X processing unit 1204 negotiates with the authentication server 1102 to execute the IEEE802.1X authentication processing, and acquires the authentication result. An IEEE802.1X control unit 1203 controls the IEEE802.1X processing unit 1204.

A network I/F control unit 1205 controls the transmission and reception of the packet performed by the network I/F 225. The network I/F control unit 1205 monitors which mode the information processing apparatus 210 operates in, the normal power mode or the power saving mode. When the information processing apparatus 210 is operated in the normal power mode, the network I/F control unit 1205 transfers the packet received from the LAN 120 to the information processing apparatus 210. When the information processing apparatus 210 is operated in the power saving mode, the network I/F control unit 1205 transfers the packet received from the LAN 120 to the IEEE802.1X processing unit 1204.

A proxy response processing unit 1201 receives the received packet which is transferred from the IEEE802.1X processing unit 1204. The IEEE802.1X processing unit 1204 receives the packet only while the information processing apparatus 210 is being operated in the power saving mode, so that the proxy response processing unit 1201 is also operated only in that case.

The proxy response processing unit 1201 classifies the received packets into three types; a "packet to be discarded," a "packet to be transferred to the information processing apparatus 210," and a "packet to be responded instead." The "packet to be discarded," the "packet to be transferred to the information processing apparatus 210," and the "packet to be responded instead" are the same as those described in the first exemplary embodiment.

FIGS. 13 to 16 are flow charts describing processing in which the information processing apparatus 210 notifies the NIC 220 of the authentication information acquired by the information processing apparatus 210 negotiating with the authentication server 1102 when the information processing apparatus 210 is brought into the power saving mode.

Each operation (step) illustrated in the flow chart of FIG. 13 is realized by the CPU 211 of the information processing apparatus 210 executing a control program. Each operation (step) illustrated in the flow charts of FIGS. 14 to 16 is realized by the CPU 221 of the NIC 220 executing a control program.

The sleep control unit 1210 of the information processing apparatus 210 operates similarly to that described in FIG. 5 for the first exemplary embodiment, so that description thereof is omitted. However, in step S501 of FIG. 5, the sleep control unit 310 inquires of the IPSec control unit 308 whether the information processing apparatus 210 can be switched to sleep state, whereas the sleep control unit 1210 inquires of the IEEE802.1X control unit 1208 in the present exemplary embodiment. In step S504 of FIG. 5, the sleep control unit 310 notifies the IPSec control unit 308 of the switching to the sleep state, whereas the sleep control unit 1210 notifies the IEEE802.1X control unit 1208 in the present exemplary embodiment. In step S505 of FIG. 5, the sleep control unit 310 waits for a response from the IPSec control unit 308, whereas the sleep control unit 1210 waits for a response from the IEEE802.1X control unit 1208 in the present exemplary embodiment.

FIG. 13 illustrates the operation of the IEEE802.1X control unit 1208. In step S1301, the IEEE802.1X control unit 1208 stands by until the sleep control unit 1210 notifies the IEEE802.1X control unit 1208 of the switching to the sleep state.

If the sleep control unit 1210 notifies the IEEE802.1X control unit 1208 of the switching to the sleep state (YES in step S1301), the processing proceeds to step S1302 and the IEEE802.1X control unit 1208 acquires the authentication information stored in the RAM 214. In step S1303, the IEEE802.1X control unit 1208 notifies the NIC 220 of the authentication information acquired in step S1302 via the communication unit between CPUs 1207.

In step S1304, the IEEE802.1X control unit 1208 transmits a response to the sleep control unit 1210. Thereafter, the information processing apparatus 210 is brought into the sleep mode, so that the IEEE802.1X control unit 1208 stops operation.

FIG. 14 illustrates the operation of the IEEE802.1X control unit 1203 of the NIC220. In step S1401, the IEEE802.1X control unit 1203 sets an authentication information reception flag to OFF. The authentication information reception flag is stored in an area secured on the RAM 224. The IEEE802.1X processing unit 1204 refers to this flag.

In step S1402, the IEEE802.1X control unit 1203 waits to receive the authentication information from the information processing apparatus 210. If the IEEE802.1X control unit 1203 receives the authentication information (YES in step S1402), then in step S1403, the IEEE802.1X control unit 1203 secures an area on the RAM 224 to store the received authentication information therein. The processing proceeds to step S1404 and the IEEE802.1X control unit 1203 sets the authentication information reception flag set to OFF in step S1401 to ON.

FIG. 15 illustrates the operation of the IEEE802.1X processing unit 1204 of the NIC 220. In step S1501, the IEEE802.1X processing unit 1204 stands by until the packet received from the LAN 120 is transferred from the network I/F control unit 1205. If the packet is received (YES in step S1501), the processing proceeds to step S1502 and the IEEE802.1X processing unit 1204 refers to the Ethernet frame portion of the received packet to determine whether the received packet is sent to the MAC address of the NIC apparatus 220.

If it is determined that the received packet is not sent to the MAC address of the NIC apparatus 220 (NO in step S1502), the processing proceeds to step S1508, the received packet is discarded, and the processing is ended.

On the other hand, if the received packet is sent to the MAC address of the NIC apparatus 220 (YES in step S1502), the processing proceeds to step S1503 and the IEEE802.1X processing unit 1204 determines whether the received packet is the IEEE802.1X re-authentication request packet. If it is determined that the received packet is not the IEEE802.1X re-authentication request packet (NO in step S1503), in step S1507, the IEEE802.1X processing unit 1204 transfers the received packet to the proxy response processing unit 1201, and the processing is ended.

If the received packet is the IEEE802.1X re-authentication request packet (YES in step S1503), the processing proceeds to step S1504 and the IEEE802.1X processing unit 1204 determines whether the authentication information is received with reference to the authentication information reception flag on the RAM 224.

If the authentication information is not received (NO in step S1504), then in step S1507, the IEEE802.1X processing unit 1204 transfers the received packet to the proxy response processing unit 1201 and the processing is ended.

If it is determined that the authentication information is received (YES in step S1504), then in step S1505, the response packet is generated based on the authentication information stored in the RAM 224. In step S1506, the generated response packet is transmitted, and the processing is ended.

FIG. 16 illustrates the operation of the proxy response processing unit 1201. In step S1601, the proxy response processing unit 1201 stands by until it receives the packet transferred from the IEEE802.1X processing unit 1204. If the packet is received (YES in step S1601), the processing proceeds to step S1602 and the proxy response processing unit 1201 determines whether the received packet is the "packet to be responded instead."

The above determination is made based on packet pattern information of which the information processing apparatus 210 notified the NIC 220 before the information processing apparatus 210 is switched to the power saving mode. More specifically, the information processing apparatus 210 notifies the NIC 220 of a reception packet pattern for identifying the packet to be responded by the NIC 220 and a transmission packet to be transmitted as a response while the information processing apparatus 210 is operating in the power saving mode and registers them. When the NIC220 receives the packet coinciding with the reception packet pattern, the proxy response processing unit 1201 determines that the received packet is the "packet to be responded instead" (YES in step S1602) and the processing proceeds to step S1606.

If the proxy response processing unit 1201 determines that the received packet is not the "packet to be responded instead" (NO in step S1602), the processing proceeds to step S1603 and the proxy response processing unit 1201 determines whether the received packet is the "packet to be transferred to the information processing apparatus 210." As is the case with the determination in step S1602, the determination is made based on packet pattern information of which the information processing apparatus 210 notified the NIC 220 before the information processing apparatus 210 was switched to the power saving mode.

If the proxy response processing unit 1201 determines that the received packet is the "packet to be transferred to the information processing apparatus 210" (YES in step S1603), the processing proceeds to step S1605 and the received packet is transferred to the information processing apparatus 210. On the other hand, if the proxy response processing unit 1201 determines that the received packet is not the "packet to be transferred to the information processing apparatus 210" (NO in step S1603), the processing proceeds to step S1604 and the received packet is discarded.

In step S1606, the proxy response processing unit 1201 generates a response packet to be transmitted as a response to the received packet. The processing proceeds to step S1607, the response packet is transmitted to the external apparatus, and the processing is ended.

As described above, the information processing apparatus 210 can notify the network interface apparatus (NIC 220) of the information (authentication information) acquired by the information processing apparatus 210 negotiating with the external apparatus (the authentication server 1102) when the information processing apparatus 210 is brought into the power saving mode.

Therefore, the NIC 220 can perform communication via a network without the need for the NIC 220 to negotiate again with the external apparatus when the information processing apparatus 210 is brought into the power saving mode.

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-060685 filed Mar. 13, 2009, which is hereby incorporated by reference herein in its entirety.

What is claimed is:

1. A communication system including a network interface apparatus and an information processing apparatus,
the information processing apparatus comprising:
a negotiation unit configured to perform negotiation processing for acquiring communication information for executing encryption communication, with an external apparatus;
a first communicating unit configured to execute, when the information processing apparatus is operating in a first power mode, the encryption communication with the external apparatus based on the acquired communication information; and
a notification unit configured to notify the network interface apparatus of the acquired communication information; and
the network interface apparatus comprising:
a second communicating unit configured to execute, in a case where the information processing apparatus operates in a second power mode of which power consumption is lower than the first power mode, the encryption communication, with the external apparatus, based on the communication information notified by the notification unit;
a determining unit configured to determine whether the communication information notified by the notification unit is effective; and
a switching unit configured to cause the information processing apparatus to switch, in a case where the determining unit determines that the communication information notified by the notification unit is not effective, from the second power mode to the first power mode.

2. The communication system according to claim 1, wherein the information processing apparatus further comprises a detection unit configured to detect that the information processing apparatus satisfies a condition for switching from the first power mode to the second power mode,
wherein the notification unit notifies the network interface apparatus of the acquired communication information, in a case where the detection unit detects that the information processing apparatus satisfies a condition for switching from the first power mode to the second power mode.

3. The communication system according to claim 1, wherein the encryption communication is an IPSec communication, and the communication information is SA (security association) information.

4. A method for an information apparatus in a communication system including a network interface apparatus,
the method comprising:
performing negotiation processing for acquiring communication information for executing encryption communication, with an external apparatus;
executing, when the information processing apparatus is operating in a first power mode, the encryption communication with the external apparatus based on the acquired communication information; and notifying the network interface apparatus of the acquired communication information; and
executing, in a case where the information processing apparatus operates in a second power mode of which power consumption is lower than the first power mode, the encryption communication, with the external apparatus, based on the communication information;
determining whether the communication information notified by the notifying is effective; and
a switching, in a case where the determining determines that the communication information notified by the notifying is not effective, from the second power mode to the first power mode.

5. The method according to claim 4 further comprising:
a detecting that the information processing apparatus satisfies a condition for switching from the first power mode to the second power mode; and
notifying the network interface apparatus of the acquired communication information, in a case where the information processing apparatus satisfies a condition for switching from the first power mode to the second power mode.

6. The method according to claim 4, wherein the encryption communication is an IPSec communication, and the communication information is SA (security association) information.

7. A computer readable medium, storing a computer-executable program of instructions for causing a computer to perform a method for an information apparatus in a communication system including a network interface apparatus, comprising:
performing negotiation processing for acquiring communication information for executing encryption communication, with an external apparatus, the negotiation processing being based on a type of algorithm used in the encryption communication;
executing, when the information processing apparatus is operating in a first power mode, the encryption communication with the external apparatus based on the acquired communication information; and notifying the network interface apparatus of the acquired communication information; and
executing, in a case where the information processing apparatus operates in a second power mode of which power consumption is lower than the first power mode, the encryption communication, with the external apparatus, based on the communication information;
determining whether the communication information notified by the notifying is effective; and
a switching, in a case where the determining determines that the communication information notified by the notifying is not effective, from the second power mode to the first power mode.

8. The computer readable medium according to claim 7 further comprising:
a detecting that the information processing apparatus satisfies a condition for switching from the first power mode to the second power mode; and
notifying the network interface apparatus of the acquired communication information, in a case where the information processing apparatus satisfies a condition for switching from the first power mode to the second power mode.

9. The computer readable medium according to claim 7, wherein the encryption communication is an IPSec communication, and the communication information is SA (security association) information.

\* \* \* \* \*